(12) United States Patent
Burdick

(10) Patent No.: US 6,982,633 B2
(45) Date of Patent: Jan. 3, 2006

(54) HELMET HAVING A RING OF LIGHT

(76) Inventor: Joshua Burdick, 32 Washington Sq. West, New York, NY (US) 10011

( * ) Notice: Subject to any disclaimer, the term of this patent is extended or adjusted under 35 U.S.C. 154(b) by 89 days.

(21) Appl. No.: 10/842,658

(22) Filed: May 10, 2004

(65) Prior Publication Data

US 2004/0227628 A1    Nov. 18, 2004

Related U.S. Application Data

(60) Provisional application No. 60/473,693, filed on May 28, 2003, provisional application No. 60/469,775, filed on May 12, 2003.

(51) Int. Cl.
*B62J 6/00* (2006.01)
(52) U.S. Cl. ........................ 340/432; 340/368
(58) Field of Classification Search ................. 340/432
See application file for complete search history.

(56) References Cited

U.S. PATENT DOCUMENTS

| | | | |
|---|---|---|---|
| 4,195,328 A * | 3/1980 | Harris, Jr. .................... 362/549 |
| 4,559,516 A | 12/1985 | Schott et al. | |
| 4,559,586 A | 12/1985 | Slarve | |
| 4,760,373 A * | 7/1988 | Reilly ......................... 340/432 |
| 4,769,629 A * | 9/1988 | Tigwell ....................... 340/467 |
| 4,891,736 A | 1/1990 | Gouda | |
| 4,956,752 A * | 9/1990 | Foglietti ..................... 362/473 |
| 5,040,099 A | 8/1991 | Harris | |
| 5,207,500 A | 5/1993 | Rios et al. | |
| 5,353,008 A * | 10/1994 | Eikenberry et al. ......... 340/479 |
| 5,477,209 A * | 12/1995 | Benson et al. ............... 340/479 |
| 5,704,707 A * | 1/1998 | Gebelein et al. ............ 362/106 |
| 5,910,764 A * | 6/1999 | Hayden ....................... 340/479 |
| 6,097,287 A * | 8/2000 | Lu .............................. 340/479 |

(Continued)

FOREIGN PATENT DOCUMENTS

IT    639512    5/1962

OTHER PUBLICATIONS

"The Signalfly Helmet Brake Light," Web Bike World, 2001, http.//webbikeworld.com/Reviewed-motorcycle-products/signalfly.

Primary Examiner—Jeffery Hofsass
Assistant Examiner—George Bugg
(74) Attorney, Agent, or Firm—Buchanan Ingersoll PC

(57) ABSTRACT

A motorcycle helmet having a ring of light enables the wearer to be seen by anyone, no matter where that person is on a circle centered on the wearer. The ring of light is attached to the shell of the helmet and extends completely around the helmet. The ring of light has a circumferential housing containing a right housing segment, a left housing segment, and a rear housing segment, each containing at least one light. A lens covering is provided over the lights on each segment. The light or lights and lens on the rear segment should together produce a red light beam when the light is activated. A receiver on the ring of light is connected to the lights in the left, right and rear housing segments. The receiver is activated by a transmitter on the motorcycle that is connected to the bike's electrical system. When the brake light or signal lights are activated the transmitter sends signals which the receiver uses to selectively activate the lights in the ring of light. A battery is provided on the ring of light and is connected to the lights and the receiver.

24 Claims, 3 Drawing Sheets

U.S. PATENT DOCUMENTS

| | | | |
|---|---|---|---|
| 6,157,298 A * | 12/2000 | Garfinkel et al. | 340/479 |
| 6,348,859 B1 * | 2/2002 | Baker | 340/479 |
| 6,529,126 B1 * | 3/2003 | Henry | 340/467 |
| 6,538,567 B2 * | 3/2003 | Stewart | 340/475 |
| 6,686,837 B2 * | 2/2004 | Kim | 340/479 |
| 6,784,795 B1 * | 8/2004 | Pories et al. | 340/479 |
| 6,914,520 B2 * | 7/2005 | Chung | 340/332 |
| 6,933,839 B2 * | 8/2005 | Henry | 340/479 |

\* cited by examiner

HELMET HAVING A RING OF LIGHT

CROSS REFERENCE TO RELATED APPLICATIONS

Applicant claims benefit to provisional application Ser. No. 60/469,775, filed May 12, 2003, and provisional application Ser. No. 60/473,693, filed May 28, 2003.

FIELD OF INVENTION

The invention relates to helmets worn by motorcycle riders.

BACKGROUND OF THE INVENTION

One of the leading causes of accidents involving motorcycles is the failure of other drivers to see the motorcycle. A 1981 report (referred to as the Hurt Report) prepared by the University of Southern California analyzed motorcycle accidents. 74% of those accidents were with other vehicles. Of those, 50% were precipitated by other drivers who reported that they did not see the motorcyclist. Since a motorcycle (with driver) has a much narrower profile than other legal motorized vehicles on the road, their inherent design allows limited area for any lighting devices. Some studies claim that human depth perception is affected when a motorcycle is viewed amongst bigger cars and trucks, making the motorcycle seem further away than it is.

The largest percentage of motorcycle accidents occur with other vehicles at intersections with front or perpendicular approaching vehicles. Therefore, importance of being seen by others while operating a motorcycle cannot be understated.

The art has recognized the need to make motorcycles and their riders more visible to other drivers. Many have proposed providing lights on the back of the helmet which is worn by the motorcycle driver. Slarve in U.S. Pat. No. 4,559,586, Gouda in U.S. Pat. No. 4,891,736 and Rios et al. in U.S. Pat. No. 5,207,500 disclose motorcycle helmets having an auxiliary brake lamp and signal lamps on the back of the helmet. All provide a cable that runs from the helmet and is connected to the electrical system of the motorcycle. An obvious short-coming of these products is the cord, which can become tangled and impede the movement of the wearer of the helmet, particularly as he or she mounts and dismounts the motorcycle. A second shortcoming of these products is that the lights are all positioned on the rear of the helmet and each light has a relatively small surface area.

Harris in U.S. Pat. No. 5,040,099 and Foglietti in U.S. Pat. No. 4,956,752 provide motorcycle helmets having lights on the rear of the helmet. Rather than provide a cable, these products have a receiver in the helmet that receives signals from a transmitter on the motorcycle. In recent years there has been available a helmet brake light sold separate from the helmet. This brake light is attached to the back of the helmet by an adhesive and is sold under the name "The Signalfly." This product also has a receiver which receives signals from a transmitter on the motorcycle.

It is also known to provide lights on the top or front of the motorcycle helmet which face forward and illuminate the path ahead of the motorcycle. Harris, Jr. discloses such a helmet in U.S. Pat. No. 4,195,328.

Although many types of motorcycle helmets with lights have been proposed, relatively little of the surface area of the helmet is illuminated by these lights. Moreover, the illuminated surfaces tend to be only a few square inches on the back or the front of the helmet. These lights cannot be seen, except by a person who is on a line perpendicular to the surface of the light or who is within a few degrees of that line. Consequently, there remains a need for a motorcycle helmet which is readily visible when illuminated and viewed from any angle.

SUMMARY OF THE INVENTION

I provide a motorcycle helmet having a continuous ring of light. This enables the wearer to be seen by anyone, no matter where that person is on a circle centered on the wearer. The ring of light is attached to, or could be incorporated into, the shell of the helmet and circumscribes the perimeter of the helmet. The ring of light has a circumferential housing containing three housing segments each 120 degrees of a circle: a right housing segment, a left housing segment and a rear housing segment, each containing a series of lights. A continuous lens covering is provided over the lights on each segment. The light or lights and lens on the rear segment will together produce a red light beam when the light is activated. Lights on the left or right segments preferably are amber. A receiver on the ring of light is connected to the lights in the left, right and rear housing segments. The receiver is activated by a transmitter on the motorcycle that is connected to the bike's electrical system. When the brake light or signal lights are activated the transmitter sends signals which the receiver uses to selectively activate the lights in the ring of light. Batteries within the ring of light provide power to the lights and the receiver.

I prefer to provide one or more switches on the ring of light to enable the user to turn all the lights or selected lights on or off and to cause those lights to flash. The lights could be incandescent lamps, light emitting diodes or halogen lamps. The ring of light may also have portions that reflect visible light.

Other objects and advantages of my helmet having a ring of light will become apparent from a description of certain present preferred embodiments thereof which are shown in the drawings.

DESCRIPTION OF THE PREFERRED EMBODIMENTS

Figure 1:
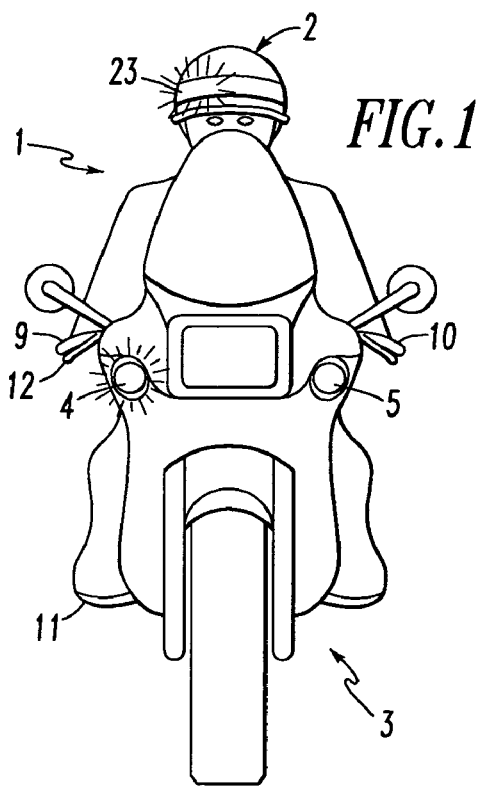
FIG. 1 is a front view of a rider on a motorcycle who is wearing a present preferred embodiment of my motorcycle helmet having a ring of light.
Figure 2:
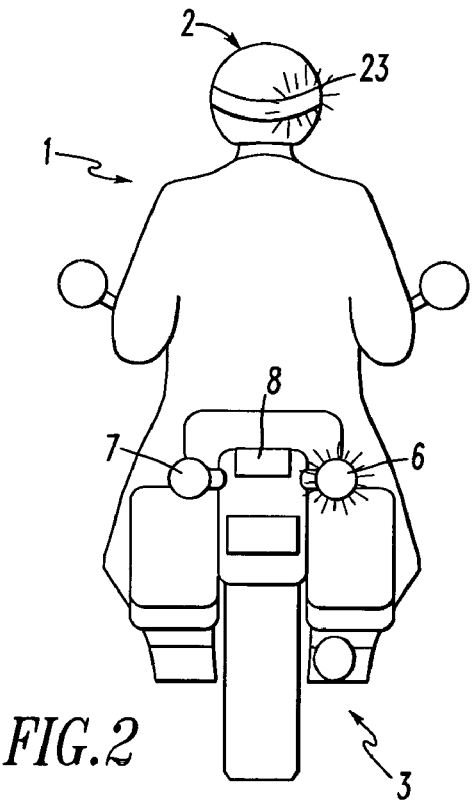
FIG. 2 is a rear view of the rider on a motorcycle shown in FIG. 1.
Figure 3:
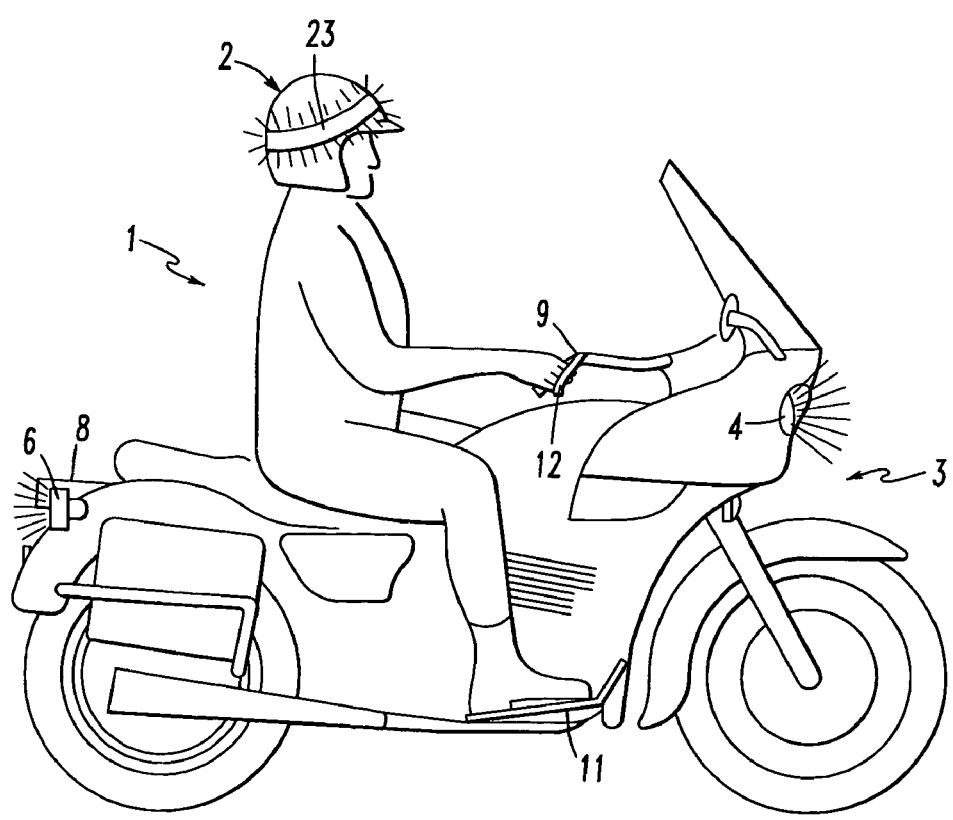
FIG. 3 is a side view of the rider on a motorcycle shown in FIG. 1 and FIG. 2.

A rider wearing a present preferred embodiment of my motorcycle helmet is shown on a motorcycle in FIGS. 1, 2 and 3. The motorcycle as depicted in FIG. 1 has a right front turn signal 4 and left front turn signal 5. The motorcycle as depicted in FIG. 2 has a rear right turn signal 6 and rear left turn signal 7. A brake light, which also functions as a tail light, 8 is provided on the back of the motorcycle. The motorcycle driver activates the right turn signal lights 4 and 6 by operating a switch 9 on the right handle bar. The left turn signal lights 5 and 7 may be operated by the same switch or by another switch 10 on the left handle bar. The brakes may be operated by pedal 11 or a hand brake 12 also on one of the handle bars. Some models of motorcycles may have the brake switch only in the pedal or only on a handlebar. The present invention can be used with all types of motorcycles.

Figure 4:
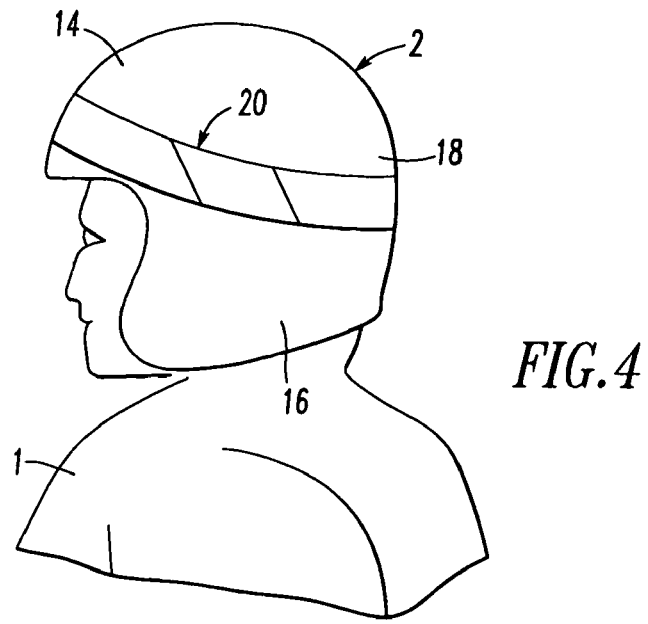
FIG. 4 is a left side view of the present preferred motorcycle helmet being worn by the rider in FIGS. 1, 2 and 3, the right side being a mirror image thereof.
Figure 5:
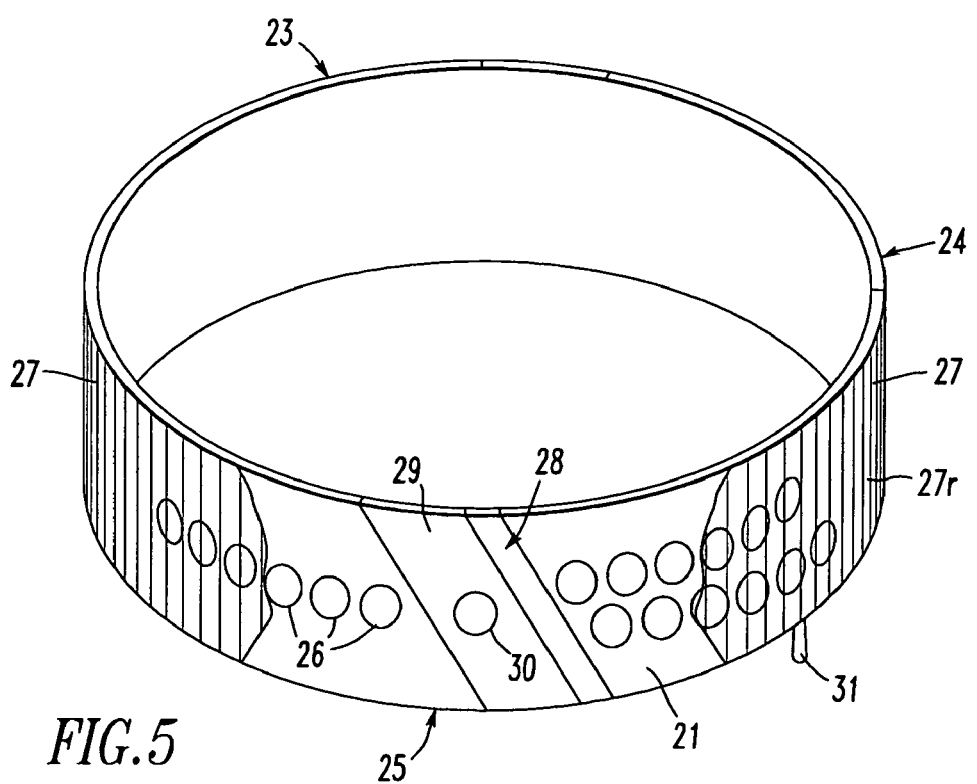
FIG. 5 is a perspective view of the ring of light which is used on the helmet in FIG. 4.
Figure 6:
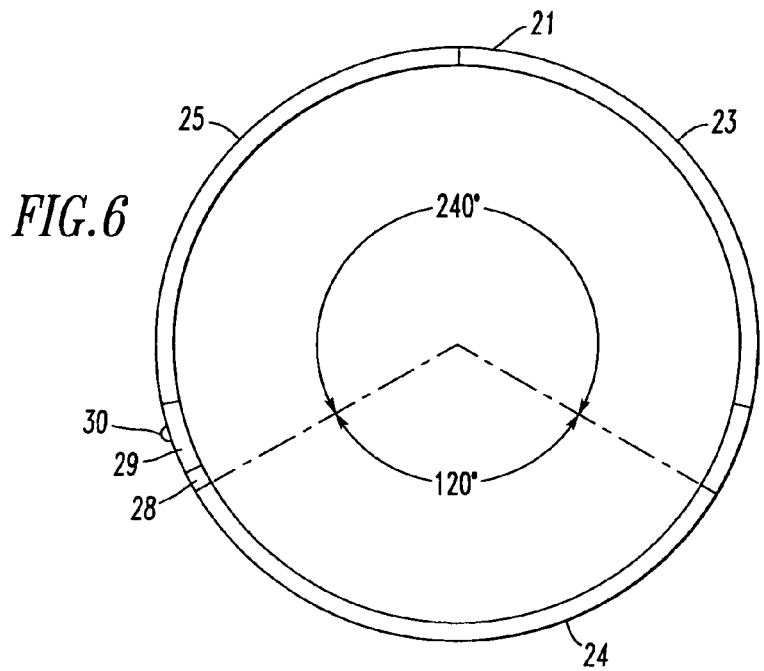
FIG. 6 is a plan view showing degrees of coverage of the ring of light shown in FIG. 5.

FIG. 4 is an enlarged depiction of the helmet worn by the rider. The helmet 2 has a shell 14 which is sized to fit over a rider's head. I provide a ring of light 20 on the helmet as seen most clearly in FIGS. 1, 2 and 3. The ring of light, shown separate from the helmet in FIG. 5 and FIG. 6, has a generally circular housing 21 having a right housing segment 23, a left housing segment 25 and a rear housing segment 24. When fitted onto or within the mold of a helmet the right housing segment 23 of the ring of light is situated on the right segment of the helmet shell. The left housing segment 25 is situated on the left segment 16 of the helmet shell. The rear housing segment 24 of the ring of light is situated on a rear segment 18 of the helmet shell. The left housing segment and right housing segment of the ring of light extend together towards what might be perceived as the front of the helmet and continue each around to the back of the helmet shell terminating at 240 degrees of the circle of the ring allowing for the remaining 120 degrees to be considered the rear housing segment 24. A series of light emitting diodes 26 are provided on the circumferential housing of the ring of light. Preferably, there is at least one light on each of the housing segments. The lights could be incandescent lamps, halogen lamps, or light emitting diodes. As shown in FIGS. 4 and 5 a lens or cover 27 is provided over each housing segment. The lenses or another portion of the ring of light could be a material that reflects visible light. The lens 27r that covers the rear housing segment is tinted red. Lenses that cover the lights on the front, left and right housing segments preferably are clear or tinted amber or yellow. However, if desired the lenses could be a different color or have multiple colors. In one embodiment I provide yellow light emitting diodes in the left and right segments and below a portion of the rear segment. When the brake light is activated at the same time as a turn signal, some of the yellow light emitting diodes activated by the turn signal will be illuminated below the illuminated red lights on the rear segment which are activated by the brake switch. Preferably, the lenses on the left segment and right segment of the housing will not be red. A receiver 28 and a nickel lithium battery or other power source 29 are provided on the housing 21 of the ring of light. I further prefer to provide a switch 30 on the housing 21. The switch 30 allows the lights in the ring of light to be manually turned on and turned off. I prefer to also provide a switch or a switch position which causes the lights or selected lights to flash on and off.

Figure 7:
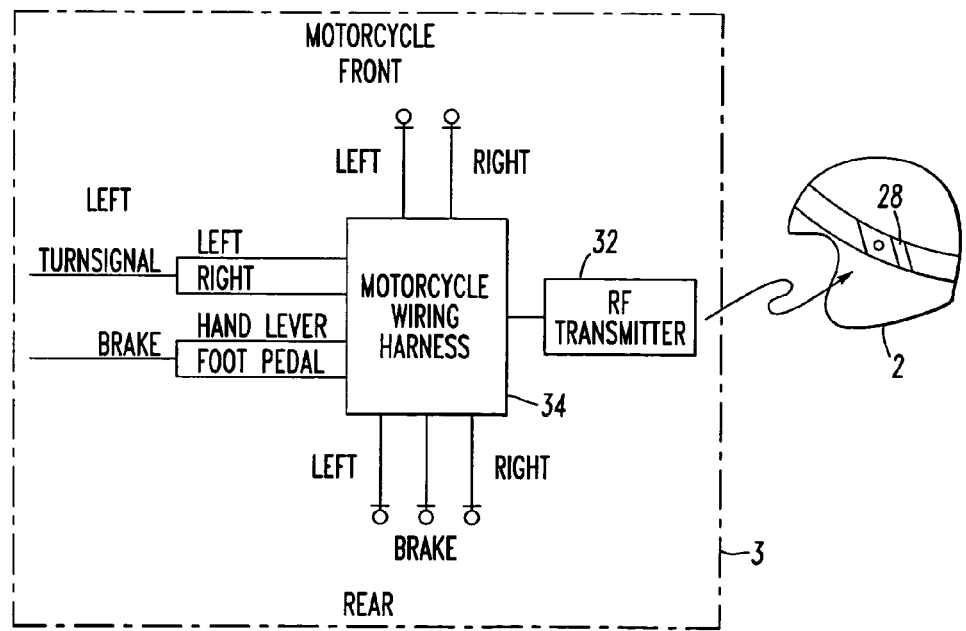
FIG. 7 is a diagram illustrating the basic electronics and operation of the motorcycle helmet shown in FIG. 4.

Turning to the diagram of FIG. 7, a transmitter 32 is connected through a wiring harness 34 to the electrical system of the motorcycle indicted by outlined box 3. The connection is such that when the left or right turn signal of the motorcycle is activated the transmitter 32 sends a signal to the receiver 28. That signal causes the receiver to activate the light emitting diodes in the corresponding left or right housing segments of the ring of light. In FIGS. 1, 2 and 3 the right turn signals 4 and 6 of the motorcycle and right segment 23 of the helmet are shown as being illuminated. When the brake switch is activated through the hand lever or foot pedal, a signal is sent by the transmitter to the receiver. That signal prompts the receiver to turn on the lights in the rear segment 24 of the ring of light. Should the rider activate an emergency flasher on the cycle, that will cause the transmitter to send a pulse to the receiver which will activate lights in both the right housing segment and the left housing segment causing those lights to flash. If desired, the product could be configured so that all lights on the ring of light flash when the motorcycle flasher is activated. Whenever the brake lights or signal lights of the motorcycle are turned on, the corresponding lights in the ring of light will also be activated. Those lights in the left segment and right segment preferably will flash in sync with the flashing of the corresponding signal lights on the motorcycle.

As should be apparent from the drawings, when all lights of the helmet are activated the helmet can be viewed from any direction relative to the motorcycle. When the left turn signal is activated anyone standing in front or behind the cycle will be able to see the flashing lights in the left segment of the ring of light on the helmet. Similarly, when the right turn signal is activated anyone standing in front or behind the cycle will see the lights in the right segment of the ring of light flashing.

On occasion a motorcycle operator will carry a passenger with him/her on his/her motorcycle. Usually, the passenger sits behind the motorcycle driver. If the driver of the motorcycle is wearing a helmet of the type disclosed here, a passenger sitting behind the motorcycle driver will block a view of a portion of the helmet worn by the driver. Furthermore, activation of the lights in the rear segment of a ring of light could cause distraction or irritation to the passenger. I, therefore, prefer to provide for the passenger a second helmet similar to the helmet worn by the motorcycle driver. When a passenger is riding on the motorcycle the driver should have the capability of turning off the lights in the rear segment of the ring of lights in his or her helmet. Consequently, I prefer to provide a second switch 31 adjacent the rear section 24. Switch 31 enables the driver or passenger of the motorcycle to turn off the lights in the rear housing segment 24 of the ring of light.

While the drawings illustrate only the lights on the right or left segments of the ring of light being activated with the right or left turn signal, other illumination patterns could be used. Specifically, one or more lights in the rear segment could illuminate with the lights on either the right segment or the left segment.

The ring of light on the helmet of a motorcycle rider and on the helmet of any passenger significantly increases the visibility of the motorcycle and its occupants. They are much more visible than a rider wearing a helmet having lights on only the rear portion of the helmet.

Although I have shown present preferred embodiments of my helmet having a ring of light, it should be distinctly understood that the invention is not limited thereto, but may be variously embodied within the scope of the following claims.

I claim:

1. A helmet for use while riding a motorcycle, the motorcycle having a brake light activated by at least one of a pedal and handle bar mounted brake switch, a left turn signal activated by a left signal switch and a right turn signal activated by a right turn signal switch, the helmet comprised of:

a shell sized and shaped to fit onto a rider's head, the shell having a circumferential portion, the circumferential portion having a right segment, a rear segment and a left segment connected in series and together forming the circumferential portion;

a ring of light attached to the shell and extending around the circumferential portion, the ring of light comprised of:
i) a circumferential housing having:
a right housing segment containing at least one light, the right housing segment being on the right segment of the shell;
a left housing segment containing at least one light, the housing segment being on the left segment of the shell; and
a rear housing segment containing at least one light and a lens covering the at least one light, the at least one light and lens together being able to produce a red light beam when the at least one light is activated, the rear housing segment being on the rear segment of the shell, and
ii) a receiver connected to the lights in the left, right and rear housing segments, the receiver providing signals that selectively activate the lights in response to signals received from a transmitter; and
iii) a power source connected to the lights and the receiver.

2. The helmet of claim 1 also comprising at least one lens attached to the circumferential housing and covering at least one of the lights in at least one of the left housing segment and the right housing segment.

3. The helmet of claim 2 wherein the at least one lens is clear or tinted a shade of yellow.

4. The helmet of claim 1 also comprising at least one switch attached to the housing, connected to the power source and connected to at least one of the lights.

5. The helmet of claim 4 wherein the at least one switch is adapted to cause at least one of the lights that is connected to the switch to flash.

6. The helmet of claim 1 wherein a portion of the ring of lights reflects visible light.

7. The helmet of claim 1 wherein at least one of the lights is an incandescent lamp, a light emitting diode or a halogen lamp.

8. The helmet of claim 1 also comprising a transmitter positioned to transmit signals which can be received by the receiver, the transmitter adapted for connection to the brake switch, the left signal switch and the right signal switch of the motorcycle.

9. The helmet of claim 8 also comprising a wiring harness connected to the transmitter and configured for connection to the brake switch, the left signal switch and the right signal switch.

10. A ring of light configured for attachment to a helmet having a circumferential portion, the circumferential portion having a right segment, a left segment and a rear segment connected together and forming the circumferential portion, the ring of light comprised of:
a circumferential housing having:
i) a right housing segment containing at least one light;
ii) a left housing segment containing at least one light, the left housing segment connected to the right housing segment; and
iii) a rear housing segment containing at least one light and a lens covering at least one light and lens, with at least one light together being able to produce a red light beam when the at least one light is activated, the rear housing segment connected to the right and left housing segments, a receiver connected to the lights in the left, right and rear housing segments, the receiver providing signals that selectively activate the light in response to signal received from a transmitter; and
a power source connected to the lights and the receiver.

11. The ring of light of claim 10 also comprising at least one lens attached to the circumferential housing and covering at least one of the lights in at least one of the left housing segment and the right housing segment.

12. The ring of light of claim 11 wherein the at least one lens is clear or tinted a shade of yellow.

13. The ring of light of claim 10 also comprising at least one switch attached to the housing, connected to the power source and connected to at least one of the lights.

14. The ring of light of claim 13 wherein the at least one switch is adapted to cause at least one of the lights that is connected to the switch to flash.

15. The ring of light of claim 10 also comprising a reflector attached to the housing that reflects visible light.

16. The ring of light of claim 10 wherein at least one of the lights is an incandescent lamp, a light emitting diode or a halogen lamp.

17. An improved motorcycle and motorcycle helmet combination of the type in which the motorcycle has a brake light activated by at least one of a pedal and handlebar mounted brake switch, a left turn signal activated by a left signal switch and a right turn signal activated by a right signal switch, and the helmet is comprised of a shell sized and shaped to fit onto a rider's head, the shell having a circumferential portion, the circumferential portion having, a right segment, a rear segment and a left segment connected in series and together forming the circumferential portion, wherein the improvement comprises:
a ring of light attached to the shell and extending around the circumferential portion, the ring of light comprised of:
i) a circumferential housing having:
a right housing segment containing at least one light, the right housing segment being on the right segment of the shell,
a left housing segment containing at least one light, the housing segment being on the left segment of the shell, and
a rear housing segment containing at least one light and a lens covering the at least one light, the at least one light and lens together being able to produce a red light beam when the at least one light is activated, the rear housing segment being on the rear segment of the shell,
ii) a receiver connected to the lights in the left, right and rear housing segments, the receiver providing signals that selectively activate the lights in response to signals received from a transmitter, and
iii) a power source connected to the lights and the receiver; and
a transmitter attached to the motorcycle and connected to the brake switch, the left signal switch and the right signal switch such that when any of the switches is activated the transmitter will transmit a signal to the receiver and the receiver will provide a signal which activates at least one light in the ring of light.

18. The improved motorcycle and motorcycle helmet combination of claim 17 also comprising at last one lens attached to the circumferential housing and covering at least one of the lights in at least one of the left housing segment and the right housing segment.

19. The improved motorcycle and motorcycle helmet combination of claim 18 wherein the at least one lens is clear or tinted a shade of yellow.

20. The improved motorcycle helmet combination of claim 18 also comprising at least one switch attached to the housing, connected to the power source and connected to at least one of the lights.

21. The improved motorcycle helmet and motorcycle helmet combination of claim 20 wherein the at least one switch is adapted to cause at least one of the lights that is connected to the switch to flash.

22. The improved motorcycle and motorcycle helmet combination of claim 18 wherein at least one of the lights is an incandescent lamp, a light emitting diode or a halogen lamp.

23. The improved motorcycle and motorcycle helmet combination of claim 18 also comprising a second helmet, the second helmet comprised of:
- a shell sized and shaped to fit onto a rider's head, the shell having a circumferential portion, the circumferential portion having a right segment, a rear segment and a left segment connected in series and together forming the circumferential portion;
- a ring of light attached to the shell and extending around the circumferential portion, the right of light comprised of:
  i) a circumferential housing having:
  - a right housing segment containing at least one light, the right housing segment being on the right segment of the shell;
  - a left housing segment containing at least one light, the housing segment being on the left segment of the shell;
  - a rear housing segment containing at least one light and a lens covering the at least one light, the at least one light and lens together being able to produce a red light beam when the at least one light is activated, the rear housing segment being on the rear segment of the shell, and
  ii) a receiver connected to the lights in the left, right and rear housing segments, the receiver providing signals that selectively activate the lights in response to signals received from a transmitter; and
  iii) a power source connected to the lights and the receiver wherein the receiver in the second helmet receives signals from the transmitter and selectively activates lights in the ring of light in the second helmet.

24. The improved motorcycle and helmet combination of claim 23 also comprising a switch attached to the housing and power source of the second helmet, the second switch adapted to turn off selected lights on the second helmet.

* * * * *